United States Patent [19]

Engman

[11] 4,195,433
[45] * Apr. 1, 1980

[54] UTILITY SIGNAL DEVICE

[75] Inventor: Norman R. Engman, Des Moines, Iowa

[73] Assignee: Emco Specialties, Inc., Des Moines, Iowa

[ * ] Notice: The portion of the term of this patent subsequent to May 22, 1996, has been disclaimed.

[21] Appl. No.: 877,173

[22] Filed: Feb. 13, 1978

Related U.S. Application Data

[63] Continuation-in-part of Ser. No. 858,613, Dec. 8, 1977, Pat. No. 4,155,189.

[51] Int. Cl.$^2$ ............................................. A01K 97/12
[52] U.S. Cl. ......................................... 43/17; 43/17.5
[58] Field of Search ........................... 43/17, 17.5, 16; 362/109, 184, 203

[56] References Cited

U.S. PATENT DOCUMENTS

| | | | |
|---|---|---|---|
| 2,556,628 | 6/1951 | Nisle | 43/17 |
| 2,566,280 | 7/1951 | Yandt | 362/184 |
| 2,785,494 | 3/1957 | Eaton | 43/17 |
| 2,966,580 | 12/1960 | Taylor | 362/184 X |
| 2,980,889 | 4/1961 | Meissner | 362/184 X |
| 3,020,664 | 2/1962 | Snyder | 43/17 |
| 3,555,716 | 1/1971 | Long | 43/17 |
| 3,670,443 | 6/1972 | Federline | 43/17 |
| 3,959,911 | 6/1976 | Puckett | 43/17 |
| 4,112,607 | 9/1978 | Scher | 43/17 |

Primary Examiner—Nicholas P. Godici
Attorney, Agent, or Firm—Zarley, McKee, Thomte, Voorhees & Sease

[57] ABSTRACT

The utility signal device is adapted for use adjacent a body of water to resiliently support an end portion of a fishing rod thereon. The signal device comprises a housing having opposite ends and a chamber formed therein with a battery positioned in the chamber. A buzzer is mounted in the chamber and is electrically connected to the battery. A fishing rod holder is movably mounted in one end of the housing and is adapted to support an end portion of the fishing rod thereon. The fishing rod holder has a buzzer activator secured thereto which extends into the housing and which is movable into position to complete a circuit with the battery and the buzzer in response to a force on the end portion of the fishing rod. A pair of lights are provided on the housing on opposite sides of the fishing rod holder whereby the light housings provide a lateral restraint for the fishing rod. A three-way switch is movably mounted in the housing and is electrically connected to the lights and buzzer to permit the selective activation of either of the lights. One of the lights also is simultaneously eliminated when the buzzer is activated. A pair of ground stakes are removably stored within the housing and may be secured to the base of the housing to support the housing during fishing operations. Alternately, the four-way switch is provided to permit selective activation of the buzzer or one light through a rod actuated switch, or activation of either of said lights.

1 Claim, 8 Drawing Figures

UTILITY SIGNAL DEVICE

This application is a continuation-in-part of co-pending application Ser. No. 858,613 filed Dec. 8, 1977 now U.S. Pat. No. 4,155,189 issued May 22, 1979.

BACKGROUND OF THE INVENTION

This invention relates to an improvement in a device for signalling or indicating to a fisherman that a fish has taken the bait and more particularly to a device including an audio signal means which is activated when the fish takes the bait.

Fishermen commonly support fishing poles on banks adjacent bodies of water by means of sticks, pails, etc. during slow fishing periods. Many devices have been previously described for supporting the fishing rod and for alerting the fisherman to the fact a fish has taken the bait. One such device is disclosed in U.S. Pat. No. 3,959,911 which issued on June 1, 1976. The device of the U.S. Pat. No. 3,959,911 did represent a significant improvement in the art. However, the device of the U.S. Pat. No. 3,959,911 patent did not include an audio alarm or buzzer to audibly alert the fisherman. Further, the means for adjusting the resiliency of the fishing rod holder was not as convenient as in the instant invention. Likewise, the light associated with the device of the previous patent only indicated that a fish had taken the bait and did not provide suitable illumination for other uses.

Therefore, it is a principal object of the invention to provide an improved fishing signal device.

A still further object of the invention is to provide a fishing signal device including a pair of lights positioned on opposite sides of a fishing rod holder with the lights not only providing lateral restraint for the fishing rod but also providing light for signalling and illumination.

A still further object of the invention is to provide a fishing signal device including means for easily adjusting the resiliency of the audio alarm activator.

A still further object of the invention is to provide a fishing signal device including means for storing a pair of ground stakes within the housing during periods of non-use.

A still further object of the invention is to provide a fishing signal device including a three-way switch for selective illumination of either of the lights mounted thereon.

A still further object of the invention is to provide a fishing signal device which is economical of manufacture, durable in use and refined in appearance.

SUMMARY OF THE INVENTION

A utility signal device is disclosed wherein the hollow housing has a removable cover closing one end thereof and has a pair of spaced-apart lights at the other end. One of the lights is of the conventional type while the other light is a red flashing light. A rod holder is positioned between the lights and at an elevation therebelow for supporting one end of a fishing rod at times. An actuator extends from the rod holder downwardly into the housing and is adapted to complete a circuit whereby an electric buzzer within the housing will be actuated when a fish takes the bait. A three-way switch is provided in the circuitry to permit selective illumination of either of the two lights and to permit one of the lights to be illuminated simultaneously with the buzzer. A pair of ground stakes are removably stored within the housing and may be removed therefrom through the rotatable cover closing the bottom of the housing. One end of one of the ground stakes may be secured to the base of the housing whereby the housing may be maintained in position on the bank adjacent the body of water.

DESCRIPTION OF THE PREFERRED EMBODIMENT

Figure 1:
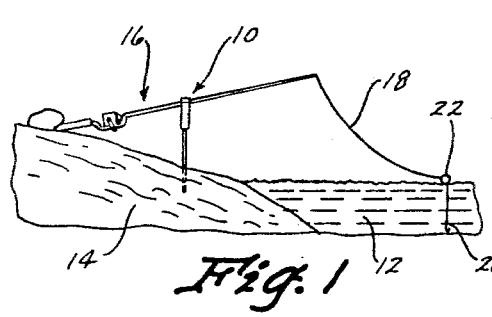
FIG. 1 is a side elevational view of the signal device of this invention in a typical environment.

In FIG. 1, the numeral 10 refers generally to the device of this invention while the numeral 12 refers to a body of water having a bank 14 adjacent thereto. The numeral 16 refers to a conventional fishing rod having a line 18 extending therefrom with a hook 20 supported at the end thereof. The numeral 22 refers to a conventional fishing bobber.

Figure 4:
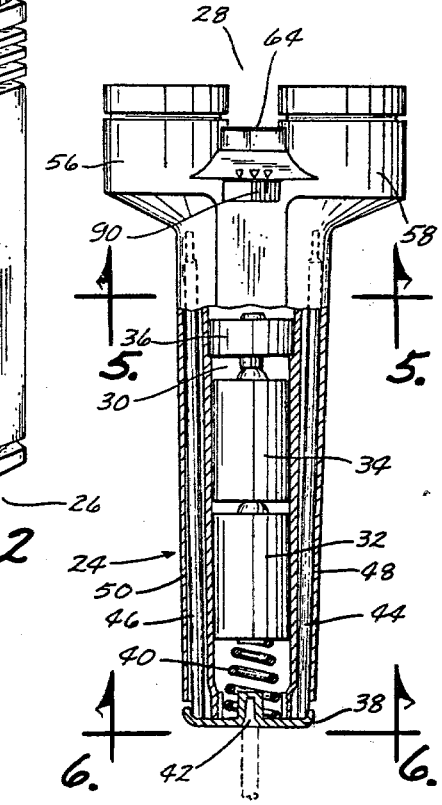
FIG. 4 is a side view of the device with portions thereof to more fully illustrate the invention.
Figure 5:
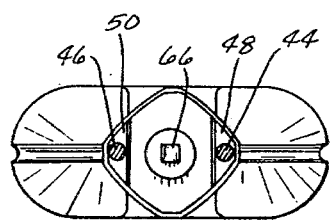
FIG. 5 is a sectional view as seen on line 5—5 of FIG. 4.

Device 10 generally comprises a housing 24 having a lower end 26 and an upper end 28. Housing 24 is provided with a chamber or compartment 30 formed therein adapted to receive batteries 32, 34 and an electric buzzer 36. As seen in FIG. 4, the lower end of chamber 30 is selectively closed by means of a cover 38 which is threadably mounted on the lower end of the housing. A spring 40 is mounted in the lower end of the chamber 30 for yieldably urging the batteries into electrical engagement with each other and with the buzzer 36.

Figure 6:
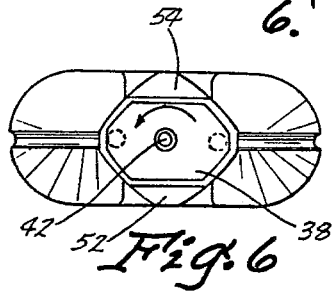
FIG. 6 is a bottom view of the device as seen on lines 6—6 of FIG. 4.

Cover 38 is provided with a recess portion 42 extending upwardly into the bottom portion thereof adapted to receive one end of a ground stake 44 or 46. Housing 24 is provided with a pair of elongated ground stake storage compartments 48 and 50 which are adapted to receive the ground stakes 44 and 46 respectively when the ground stakes are not being used to support the housing. The ground stakes 44 and 46 may be detachably secured together in an end-to-end relationship when removed from the housing with one end of one of the ground stakes being secured to the cover 38 as illustrated by broken lines in FIG. 4 to permit the housing to be supported on the bank 14 as illustrated in FIG. 1. Cover 38 is provided with a pair of cut-away portions 52 and 54 formed therein which are adapted to register with the compartments 48 and 50 when rotated as illustrated by the arrows in FIG. 6 to permit the ground stakes 44 and 46 to be removed from the housing through the cut-away portions 52 and 54. The cover 38 may be completely removed from the housing to permit the batteries to be removed therefrom as desired.

Housing 24 is provided with a pair of light housing portions 56 and 58 in which are mounted lights 60 and 62. Light 60 is of the conventional flashlight type while light 62 is of the red flashing type. Lights 60 and 62 are electrically connected to the batteries 32 and 34 as illustrated in the FIG. 7 and as will be described in more detail hereinafter.

Figure 2:
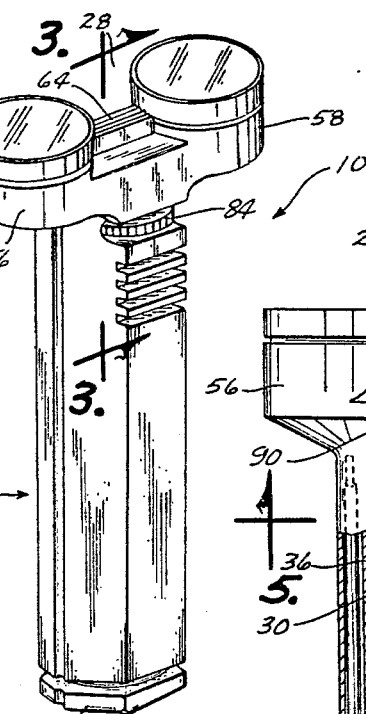
FIG. 2 is a perspective view of the device of this invention.
Figure 3:
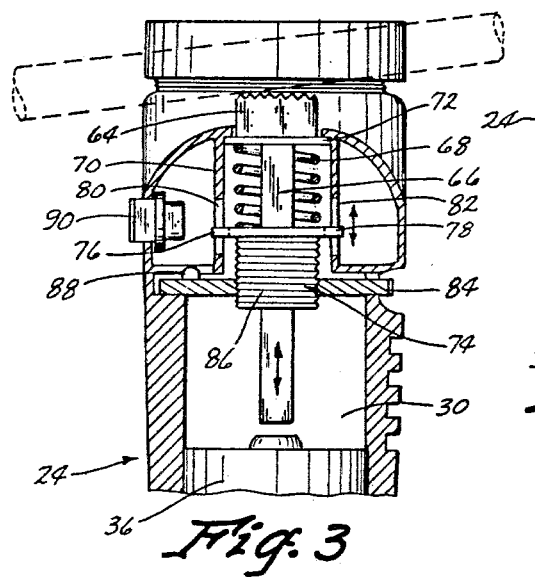
FIG. 3 is an enlarged sectional view seen on line 3—3 of FIG. 2.

The numeral 64 refers to a fishing rod holder and switch which is positioned between the housing portions 56 and 58. As seen in FIGS. 2 and 4, the upper portions of the light housing portions 56 and 58 are positioned above the holder 64 so as to provide lateral restraint for the fishing rod 16 when the fishing rod is positioned on the holder 64. An elongated member or actuator 66 extends downwardly into the housing 24 from holder 64 and has a coil spring 68 embracing the upper portion thereof. Spring 68 is enclosed within a shroud-like member 70 as best seen in FIG. 3. Stop means 72 is secured to member 66 above spring 68 to limit the upward movement of the member 66 relative to the housing as best seen in FIG. 3. Tension adjustment member 74 embraces activator 66 below spring 68 and has a pair of end portions 76 and 78 which extend through slots 80 and 82 formed in the shroud 70 to prevent the rotation of the element 74. Adjustment wheel 84 threadably embraces the threaded portion 86 of element 74 and has a peripheral portion extending outwardly through an opening formed in the housing as seen in FIGS. 2 and 3. Wheel 84 is provided with a tension limit indicator 88 which extends upwardly therefrom and which is adapted to engage the housing to indicate the upper and lower extremes of the tension adjustment. Thus, rotation of wheel 84 causes element 74 to be raised or lowered relative to activator 66 to increase or decrease the resiliency of the spring 68. In other words, when the spring 68 is compressed as much as possible, a greater force will be required on the holder 64 to move the activator 66 downwardly into engagement with the buzzer to complete the circuit therethrough and vice versa.

A three-way switch 90 is mounted on the side of the housing and may be selectively moved to one of three positions. Switch 90 may be moved into engagement with contact 92 wherein only light 60 will be illuminated. Switch 90 may also be moved into engagement with contact 94 wherein only the light 62 will be activated. In normal operation, switch 90 will be moved into engagement with conntact 96 so that closing of the activator 66 (which acts as a switch) will cause the buzzer 36 and light 60 to be activated.

Figure 8:
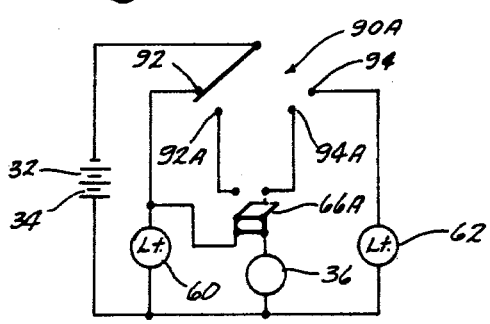
FIG. 8 is an alternative form of the invention showing alternate circuitry.

In FIG. 8, a four-way switch 90A is shown to permit either light 60 or 62 to be actuated. Similarly, the pole 92A permits only the light 60 to be actuated through rod holder switch 66A for night fishing, and pole 94A permits the buzzer 36 to be actuated by switch 66A for day fishing. This is accomplished by double pole single-throw switch 66A. When switch 90A is closed on terminal 92A, the closing of switch 66A will cause light 60 to be actuated. When switch 90A is closed on terminal 94A, the closing of switch 66A will cause buzzer 36 to be actuated. By separating the light 60 and buzzer 36, the life of batteries 32 and 34 is substantially extended.

In use, the ground stakes 44 and 46 would normally be removed from their storage compartments as previously described and secured to the bottom of the cover 38 so that the device can be secured to the bank as illustrated in FIG. 1. The fishing rod is then positioned on the bank so that a portion of the rod rests on the fishing rod holder 64 with the hook 20 being baited and being positioned in the water. Three-way switch 90 is positioned so that the switch is in engagement with contact 96. If a fish takes the bait on the hook 20, downward force will be applied to the rod which will cause the switch 64 to move downwardly into the housing to engage the buzzer and to complete the circuit therethrough. When the circuit is completed through the buzzer 36, the buzzer will be activated and will audibly indicate to the fisherman that a fish has taken the bait. Additionally, actuation of the buzzer 36 will also cause light 60 to be illuminated which also will indicate to the fisherman that a fish has taken the bait.

When the device is not being used for fishing purposes per se, the light 60 may be actuated so that the device may be used as a conventional flashlight. If emergency situations should arise, light 62 may be selectively activated which will cause the red flashing light to be illuminated which will act as an emergency signal.

Figure 7:
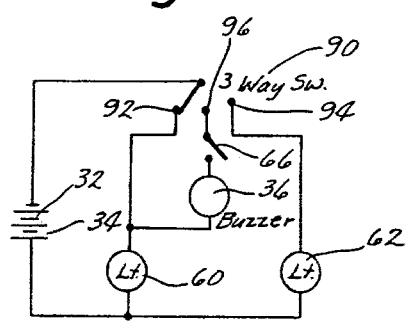
FIG. 7 is a schematic illustrating the circuitry of the invention.

If should be noted that the drawings other than FIGS. 7 and 8 do not illustrate the electrical circuitry of the invention but it should be understood that the circuitry is embodied in the schematic of FIGS. 7 and 8.

Thus it can be seen that the device has accomplished at least all of its stated objectives.

I claim:
1. A utility signal device comprising,
a housing having opposite ends and a chamber formed therein,
a battery means in said chamber,
an audio signal means in said chamber operatively electrically series connected to said battery means,
a fishing rod holder movably mounted on one end of said housing, said fishing rod holder being adapted to support an end portion of a fishing rod thereon, said fishing rod holder having an audio signal activator portion thereon which is movable into position to complete a circuit with said battery means and said audio signal means in response to a force on said one end portion of said fishing rod,
said fishing rod holder having an electric light means positioned on said housing adjacent said rod holder,
said electric light means comprising first and second electric lights which are positioned on said housing on opposite sides of said rod holder to create lateral restraint means for said fishing rod end portion,
and control switch means including a four-way switch which is mounted on said housing and is electrically connected to said lights and said audio signal means whereby either of said lights may be selectively illuminated independently of one another and independently of said audio signal means and whereby one of said lights and said audio signal means may be actuated by said rod holder.

* * * * *